US008875285B2

(12) United States Patent
Cross et al.

(10) Patent No.: US 8,875,285 B2
(45) Date of Patent: Oct. 28, 2014

(54) EXECUTABLE CODE VALIDATION IN A WEB BROWSER

(75) Inventors: David B. Cross, Redmond, WA (US); Kira Radinsky, Zichron Yaakov (IL)

(73) Assignee: Microsoft Corporation, Redmond, WA (US)

( * ) Notice: Subject to any disclaimer, the term of this patent is extended or adjusted under 35 U.S.C. 154(b) by 737 days.

(21) Appl. No.: 12/730,273

(22) Filed: Mar. 24, 2010

(65) Prior Publication Data

US 2011/0239288 A1    Sep. 29, 2011

(51) Int. Cl.
*H04L 29/06* (2006.01)

(52) U.S. Cl.
CPC ........ *H04L 63/1441* (2013.01); *H04L 63/1466* (2013.01)
USPC .............................................. 726/22; 726/24

(58) Field of Classification Search
None
See application file for complete search history.

(56) References Cited

U.S. PATENT DOCUMENTS

| | | | |
|---|---|---|---|
| 5,844,986 A * | 12/1998 | Davis ............................. | 713/187 |
| 6,640,301 B1 * | 10/2003 | Ng ................................ | 713/156 |
| 6,802,006 B1 * | 10/2004 | Bodrov ......................... | 713/187 |
| 6,850,915 B1 * | 2/2005 | Wiehler ......................... | 705/57 |
| 7,203,838 B1 * | 4/2007 | Glazer et al. .................. | 713/176 |
| 7,350,074 B2 * | 3/2008 | Gupta et al. ................... | 713/157 |
| 7,366,896 B1 | 4/2008 | Mariani et al. | |
| 7,644,275 B2 | 1/2010 | Mowers et al. | |
| 8,079,083 B1 * | 12/2011 | Bennett et al. ................. | 726/23 |
| 8,086,957 B2 * | 12/2011 | Bauchot et al. ............... | 715/234 |
| 8,166,545 B2 * | 4/2012 | Kim et al. ......................... | 726/23 |
| 8,225,392 B2 * | 7/2012 | Dubrovsky et al. ............. | 726/22 |
| 2002/0023214 A1 * | 2/2002 | Shear et al. .................... | 713/170 |
| 2003/0033435 A1 * | 2/2003 | Hanner .......................... | 709/247 |
| 2003/0074578 A1 * | 4/2003 | Ford et al. ..................... | 713/200 |
| 2003/0084301 A1 * | 5/2003 | Krawetz ........................ | 713/184 |
| 2004/0044739 A1 * | 3/2004 | Ziegler .......................... | 709/213 |
| 2005/0027988 A1 * | 2/2005 | Bodrov .......................... | 713/176 |
| 2005/0132179 A1 * | 6/2005 | Glaum et al. ..................... | 713/1 |
| 2008/0263650 A1 | 10/2008 | Kerschbaum | |
| 2008/0313734 A1 * | 12/2008 | Rozenberg et al. ............. | 726/22 |
| 2009/0094691 A1 * | 4/2009 | Dargis ............................ | 726/11 |
| 2009/0126026 A1 | 5/2009 | Kim et al. | |

(Continued)

FOREIGN PATENT DOCUMENTS

CN        1682490 A    10/2005

OTHER PUBLICATIONS

"International Search Report", Mailed Date: Oct. 31, 2011, Application No. PCT/US2011/029106, Filed Date: Mar. 18, 2011, pp. 9.

(Continued)

*Primary Examiner* — Benjamin Lanier
(74) *Attorney, Agent, or Firm* — Henry Gabryjelski; Kate Drakos; Micky Minhas

(57) ABSTRACT

An active filter monitors a web browser session to identify executable code transmitted in the session. The executable code may be analyzed to determine if the code is digitally signed. When the code is digitally signed by the web server or by another trusted source, the code may be executed. When the code is neither digitally signed or when the source is not trusted, the code may be rejected and not executed. The filter may be implemented as a web browser component or plugin, as well as a gateway device, proxy, or other service. The filter may also be implemented on the server side to reject incoming data that may include unauthenticated code.

17 Claims, 4 Drawing Sheets

(56) References Cited

U.S. PATENT DOCUMENTS

| | | | |
|---|---|---|---|
| 2009/0150999 | A1 | 6/2009 | Dewey et al. |
| 2009/0178129 | A1 | 7/2009 | Cross et al. |
| 2009/0249489 | A1 | 10/2009 | Livshits et al. |
| 2010/0024033 | A1 | 1/2010 | Kang et al. |
| 2011/0099629 | A1* | 4/2011 | Boesgaard ............... 726/22 |

OTHER PUBLICATIONS

Guan, et al., "WebIBC: Identity Based Cryptography for Client Side Security in Web Applications", Retrieved at <<http://ieeexplore.ieee.org/stamp/stamp.jsp?arnumber=04595943>>, The 28th International Conference on Distributed Computing Systems, Jun. 17-20, 2008, pp. 689-696.

Velasco, et al., "Enterprise Java Community: Are Java Web Applications Secure?", Retrieved at <<http://www.theserverside.com/tt/articles/article.tss?l=AreJavaWebApplicationsSecure>>, Jul. 2008, pp. 28.

"Profense OWASP Top 10 defenses", Retrieved at <<http://2secure.biz/webapplicationfirewall/profense-owasp-top-10-defenses/>>, Jan. 5, 2010, pp. 5.

Herzberg, et al., "Protecting web users from phishing, spoofing and malware", Retrieved at <<http://www.gbtn.org/~chlee/research/phishing/083.pdf>>, Feb. 26, 2006, pp. 15.

Garcia-Alfaro, et al., "Prevention of Cross-Site Scripting Attacks on Current Web Applications", Retrieved at <<http://hacks-galore.org/guille/pubs/is-otm-07.pdf>>, Jan. 11, 2010, pp. 18.

"Final Office Action and Search Report Issued in China Patent Application No. 201180015229.7", Mailed Date: Jun. 24, 2014, 13 Pages. (MS# 328881.03).

* cited by examiner

EXECUTABLE CODE VALIDATION IN A WEB BROWSER

BACKGROUND

Executable code is a potential attack vector for malicious attacks on either server devices running web services or on client devices running a web browser. One form of such attacks may be Cross Site Scripting or XSS attacks. According to one source, XSS attacks were roughly 70% of all security vulnerabilities documented in 2007.

SUMMARY

An active filter monitors a web browser session to identify executable code transmitted in the session. The executable code may be analyzed to determine if the code is digitally signed. When the code is digitally signed by the web server or by another trusted source, the code may be executed. When the code is neither digitally signed or when the source is not trusted, the code may be rejected and not executed. The filter may be implemented as a web browser component or plugin, as well as a gateway device, proxy, or other service. The filter may also be implemented on the server side to reject incoming data that may include unauthenticated code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
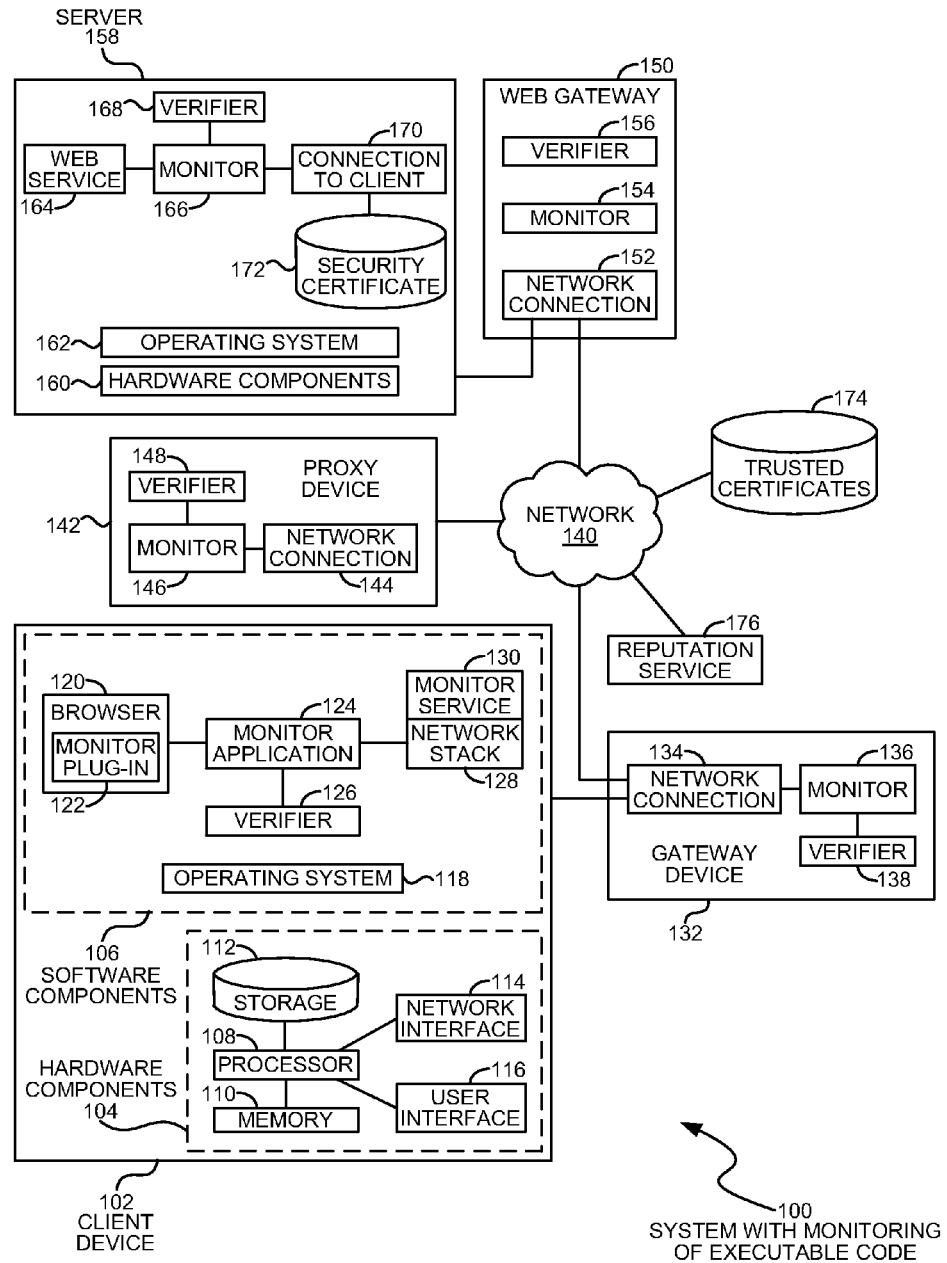
FIG. 1 is a diagram illustration of an embodiment showing an environment in which a monitoring and verifying system may operate.

Executable code passed in either direction between a web server and a client may be monitored and analyzed to determine if possible executable code is present. Prior to executing the code, a determination may be made to verify that the executable code is signed or authenticated. If the code is not properly authenticated, the code may be removed, tagged as suspicious, or otherwise dispositioned.

The monitoring and verifying processes may be implemented in several different architectures. On the client side, a monitoring service or monitoring application may be operating on the client and may intercept and analyze incoming or outgoing executable code. In another client side embodiment, a web browser or other application may have a plug-in or other module operating with the application, where the plug-in or other module may perform the monitoring and verification. On a server side, a monitoring system may monitor and verify incoming data from clients. Still other embodiments may be implemented in gateway devices, proxies, or other devices between the server and client.

The monitoring and verifying processes may address cross site scripting (XSS) attacks, a common security vulnerability, in several manners. When incoming data streams to a server are monitored, malicious code that may be uploaded from a client to the server may be prevented from reaching the server. Similarly, the monitoring of data incoming to the client may prevent unwanted or malicious executable code from reaching the client.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a network environment in which monitoring and verifying systems may be deployed to thwart XSS attacks. Embodiment 100 is a simplified example of a network environment in which executable code may be monitored, identified, and verified prior to execution.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Communications between web clients and web servers may contain executable code in several different forms. The transmitted data may contain embedded scripts or other executables in HTTP requests and HTTP responses, as well as embedded in documents or data files transmitted between web clients and web servers. In some cases, other communications between a client and server may be monitored.

XSS attacks may be classified into two main types: stored XSS attacks and reflected XSS attacks. A stored XSS attack involves injecting malicious executable code into a web server, where the malicious executable code may be stored. The attack victim may download the malicious executable code and infect a client device. The malicious executable code may be uploaded into a web service database, message forum, visitor log, comment field, or other mechanism.

A reflected XSS attack may be those where the malicious executable code may be reflected off a web server. A reflected attack may be delivered to victims through another route, such as an email message or on some other web server. When the user is tricked into clicking on a malicious link or submitting a specially crafted form, the malicious executable code may travel to the web server, which then reflects the attack back to the client device. The attack may succeed when the malicious code appears to be transmitted from the server and the client executes the malicious code.

The monitoring and verifying operations may address XSS attacks in several different manners. When operational on a web service or when monitoring a client to server communication, potentially executable code may be identified and verified prior to receiving a communication. The verification procedure for information transmitted from a client may allow executable data that are signed by a trusted party, which may be the client or another third party. Such a verification procedure may prevent malicious executable code from entering the server and may be a first step in preventing stored XSS attacks.

When the monitoring and verification operations monitor server to client communications, any inbound executable code from the server may be rejected when the executable code is not signed by the web server or a trusted third party. Such a verification procedure may prevent a client from receiving a stored XSS attack or a reflected XSS attack.

The monitoring operation may identify a Hyper Text Transfer Protocol (HTTP) communication. Such communications are often used by web browsers and other applications on a client device to communicate with a web service on a server device. In some embodiments, other communications protocols may also be monitored.

A client device 102 may communicate with a server 158. The client device 102 may execute a web browser or other application that communicates with a web service provided by the server 158. At many different places in the communication path between the client device 102 and the server 158, a monitoring and verifying operation may be performed to identify and verify potentially executable code.

The client device 102 may represent a conventional computing device with a set of hardware components 104 and software components 106. A typical embodiment may be a desktop personal computer, although other embodiments may be any type of device that may communicate with the server 158 using any protocol or any type of network connection.

The architecture of the client device 102 may be a personal computer, server computer, game console, network appliance, kiosk, or other device. In some cases, the client device 102 may be a mobile device such as a laptop or netbook computer, a mobile telephone, a personal digital assistant, or any other device by which a user may browse the Internet or otherwise interact with a server 158.

The hardware components 104 may include a processor 108 which may use random access memory 110 and nonvolatile storage 112. The hardware components 104 may also include a network interface 114 as well as a user interface 116.

The software components 106 may include an operating system 118 on which several applications may execute. A web browser 120 may be an example of such an application. Many other applications may also communicate with the server 158. For example, an accounting application may communicate with the server 158 to receive web pages to display, to download financial data, or to retrieve updates to the accounting application.

Throughout this specification and claims, references may be made to a web browser as an example application for which a monitoring and verifying operation may be performed. Such references are meant to be inclusive and any reference to a web browser application is intended to apply to any type of application.

The monitoring and verifying operations performed on a client device 102 may be directed primarily to monitoring and verifying data that is received by the client device 102 from the server 158. In some embodiments, the monitoring and verifying operations may perform operations on data transmitted by the client device 102 to the server 158.

The monitoring operations may identify a communication between an application executing on the client device 102 and a remote server, such as server 158. In some embodiments, such functionality may be performed by the application itself, such as illustrated with a monitoring plug-in 122 for the browser 120. In another embodiment, a standalone monitoring application 124 may monitor the communications between the browser 120 and a network, as represented by the network stack 128. In still another embodiment, a monitor service 130 may be incorporated into the network stack 128.

When the monitoring operation is implemented as a standalone monitor application 124 or as a monitoring service 130 on the network stack 128, the monitoring operation may protect any application executed on the client device 102. As such, the monitoring operation may protect all communications between any application and the server 158, and may be an embodiment that is included as part of a security monitoring and protection application that may provide other security functions, such as malware scanning, firewall services, and other functions.

In such an embodiment, unverified executable code may be dispositioned in several different manners. In one manner, the unverified executable code may be removed from the data. An application may then receive a partial set of data with the executable code missing, which may prevent the executable code from ever being executed. In another manner, the unverified executable code may be identified and flagged. The flag may be processed by applications that are configured to receive the flag, or the flag may be ignored by the application when the application is not configured to process the flag.

When the monitoring operation is implemented within an application, such as the plug-in 122 in the browser 120 or as an integral function within the application, the monitoring operation may be able to disposition a problem executable code in different manners. In addition to the manner described above for removing the executable code from the data, a browser or other application with integral monitoring may process executable code by presenting a user interface to a user through which a user may decide whether or not to execute the code.

In another embodiment, the application may be able to execute the code in a controlled or regulated manner, such as in a 'sandbox' mode or other mode with tight controls that may restrict any effects the executable code may have. Applications that are designed to accommodate the flags placed on executable code may also execute the flagged executable code in a 'sandbox' or restricted mode.

The monitoring operations may detect that a session has been configured between the client 102 and the server 158, and then may monitor the session for any data passed across the session. The data may be analyzed to identify any potentially executable code.

A detection mechanism may analyze an HTML document or other data to identify potentially executable code. Such analysis may include identifying attachments or other files included in a communication, identifying scripts, or any other analysis.

Once a potentially executable code is found, a verifier, such as verifier 126, may attempt to determine a digital signature for the executable code. In one example, a digital signature may be decrypted using a public key retrieved from the signer of the signature. The digital signature may be the result of a hash function performed on the code. Other embodiments may use different methods for validating a digital signature. After verification, the executable code may be permitted to be executed.

In order to thwart an XSS attack, the verifier may allow code that is signed by a web server, such as web server 158. Such a signature may use a self-signed certificate that has no other verification or is not traceable to any other source. The self-signed certificate may be sufficient to stop an XSS attack since an XSS attack is the delivery of malicious code from the server, where a malicious attacker inserted the executable code into the server. So long as the web server 158 uses a self-signed certificate, a conventional XSS attack may be thwarted using the monitoring and validation system.

Self-signed certificates may be security certificates that have no provenance or verification from a trusted third party. One example may be an X.509 certificate. Self-signed certificates are not normally trusted for other authentication purposes. Self-signed certificates are often used for internal domains or other functions where the trust in the device asserting the certificate is by virtue of a physical location of a network connection, such as inside a company's premises.

In the case of XSS attacks, a web service may use a self-signed certificate for any executable code so that a client or other device may be able to distinguish executable code that originated on the web service from other executable code that may have been inserted into the web service later. In such a use, the self-signed certificate may be sufficient to accurately detect XSS attacks.

Some embodiments may verify code that is digitally signed by other parties. In such cases, the web server 158 may supply a list of trusted third parties for the executable code that is supplied by the web server 158, and any of the digital signatures that match the list may be approved. Using the list, a verifier may retrieve one of the trusted certificates 174 to verify a digital signature. In such an embodiment, executable code that is signed by a third party not on the list of trusted third parties may be treated as unsigned code.

In some embodiments, a verifier may use a reputation service 176 to determine whether or not to trust a digital signature. A reputation service 176 may be a service that rates or categorizes a website, and may also provide security information for a website. In some cases, a reputation service 176 may indicate the trustworthiness of a domain's executable code as well as other indicators.

For example, a reputation service may be queried by a verifier to determine if a specific web service is expected to provide digital signatures for all of its executable code. A verifier may send the Uniform Resource Locator (URL) of a website to a reputation service and receive back a classification for the URL, which may include an indicator whether or not the URL will provide digital signatures for any executable code. If so, the data from the URL may be analyzed for signed executable code.

In another example, the response from a reputation service may indicate the trusted sources for the digital signature for executable code from a specific URL. In such an example, a large company may have several websites, each with different URL domains. However, the main company domain may contain digital certificates used to digitally sign all of the executable code provided by all of the other domains. In such an example, the reputation service may provide a link or address for the trusted domain from which the digital signatures may be trusted.

Some embodiments may include a parameter, tag, or setting in an HTML document that may indicate that any executable code supplied by the web server is supposed to be digitally signed. When a monitor detects such a setting, the monitor may then perform the analysis of the data to detect the executable code. Such embodiments may not analyze HTML documents that do not have such a parameter, tag, or setting. Other embodiments may analyze every document to detect executable code and restrict access to the executable code when the digital signature is missing or improper.

In one embodiment, a gateway device 132 may have a network connection 134 that may bridge between a local area network on which the device 102 may connect and a wide area network connection to a network 140. Gateway devices may be used as security devices that perform functions such as firewalls, network address translation (NAT), and other security functions.

The gateway device 132 may have a monitor 136 and verifier 138 connected to the network connection 134. The monitor 136 may analyze network connections between the client device 102 and server 158, and may detect a session, monitor the session for executable data, and disposition the executable data based on input from a verifier 138.

Similarly, a proxy device 142 may have a network connection 144 and may also include a monitor 146 and verifier 148. The proxy device 142 may be a system that acts as an intermediary between clients and other devices. Proxies are often used to filter communications, such as to allow or disallow access to sites based on the security policies, for example. A proxy may also monitor the communications between two devices and verify executable code that is properly digitally signed.

A web gateway 150 may provide a similar function as the gateway 132, but may be used to protect a server 158 from the network 140. Network 140 may represent the Internet in some cases.

The web gateway 150 may monitor incoming data streams. In a similar manner as gateway 132, the web gateway 150 may have a monitor 154 and verifier 156 that may monitor data received from the client device 102. The web gateway 150 may protect the web server 158 from a stored XSS attack by identifying and verifying any executable code that may be included in the incoming data. In many social networking sites, web applications, blogs, and other interactive websites, users may upload many different types of documents that may contain hidden or explicit executable code, which may be detected by the monitor 154 and dispositioned accordingly.

The server 158 may represent a typical server device having a set of hardware components 160, an operating system 162, and various applications. In some instances, the server 158 may be a cloud service, virtual machine, or other architecture.

The server 158 may have a web service 164 that provides data to client devices in response to client requests. Web services are often used to provide web pages using HTML over HTTP to browsers, although some web services may operate using Application Programming Interfaces (API) or other mechanisms.

In between the web service 164 and a connection to a client 170, a monitor 166 and verifier 168 may monitor incoming data streams from the clients. In a similar manner as described for the other monitors illustrated in embodiment 100, the monitor 166 and verifier 168 may monitor a data stream, identify any executable code, and verify the executable code before allowing the executable code to be executed.

Figure 2:
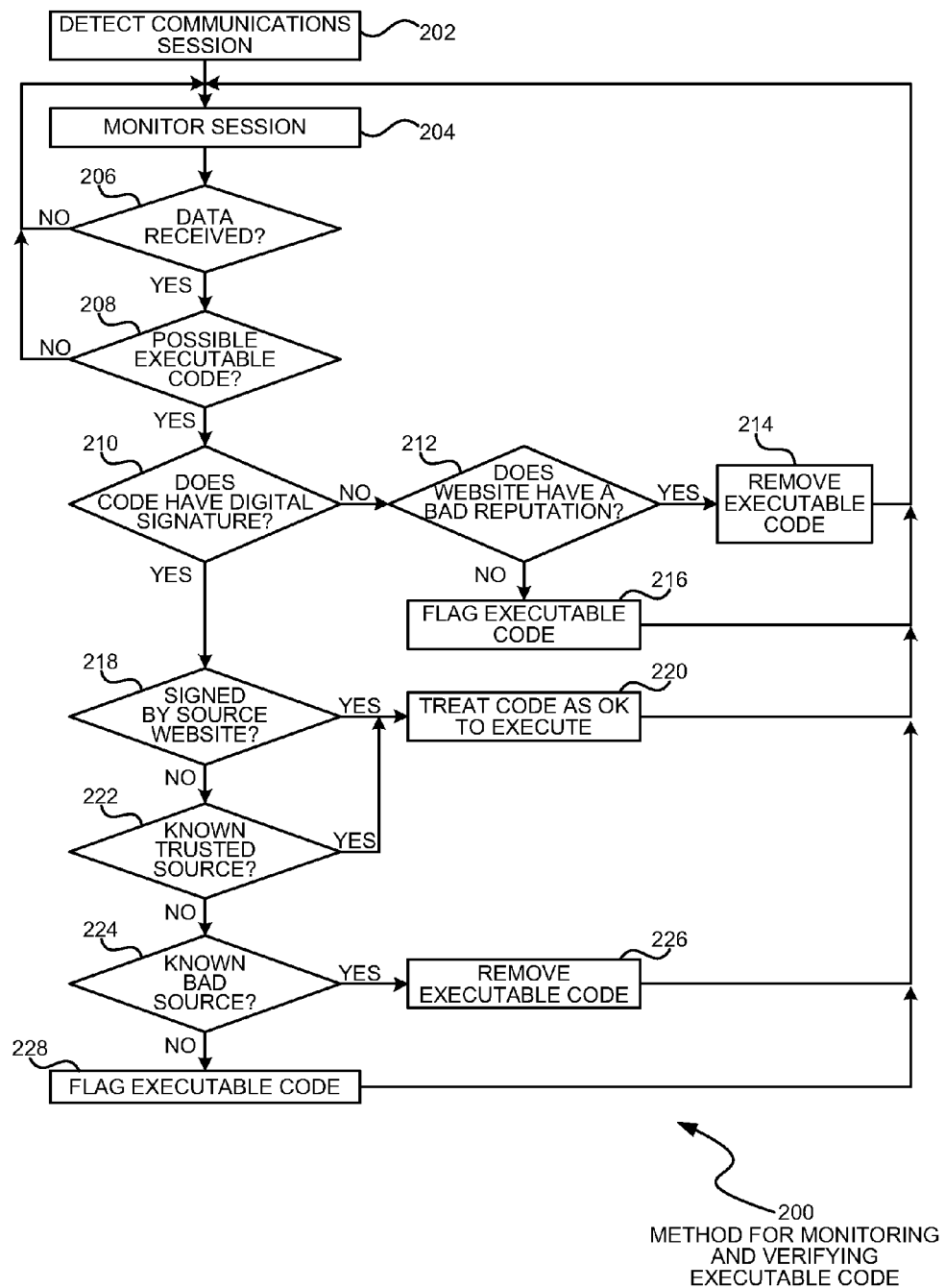
FIG. 2 is a flowchart illustration of an embodiment showing a method for monitoring and verifying executable code.

FIG. 2 is a flowchart illustration of an embodiment 200 showing a method for monitoring and verifying executable code. Embodiment 200 is a simplified example of a monitoring and verifying activity that may be performed by a gateway device, proxy device, or monitoring application, such as the gateway device 132, proxy device 142, or monitoring application 124 as illustrated in embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a method that may be performed by an application or device that is in between a client and server. In some cases, the application that performs embodiment 200 may be a security application that monitors various aspects of security for a specific device, which may be a client or server device in a client/server communication.

In block 202, a communications session is detected. A typical embodiment may detect a web browsing communications session. Such sessions are often performed by communicating through a specific port using a specific protocol through that port.

The session may be monitored in block 204. When no data are received in block 206, the process may loop back to block 204.

When data are received in block 206, an analysis may determine if the data contain executable code in block 208. If no executable code is detected in block 208, the process may loop back to block 204.

When executable code is found in block 208, an analysis in block 210 may determine if a digital signature is present. If not, a query may be made to a reputation service to determine if the server has a bad reputation in block 212.

If the server has a bad reputation in block 212, the executable code may be removed from the transmission in block 214 and the process may return to block 204. Such a situation may prevent any executable code with a bad reputation from reaching its intended target.

If the server has a good reputation in block 212, the executable code may be flagged in block 216. The flagged executable code may be transmitted along the communications session and processed by the receiving device. An example of how a device may process a flagged executable code may be found in embodiment 400 presented later in this specification.

If the code has a digital signature in block 210 and it is either signed by the source server in block 218 or by a known trusted source in block 222, the executable code may be treated as OK to execute in block 220. In many embodiments, executable code that is unflagged may be treated as OK to execute.

If the executable code is digitally signed in block 218, but not by a known trusted source in block 222, a determination is made in block 224 if the source is a known bad source or not. If the source is not a known bad source in block 224, the executable code may be flagged in block 228. If the source is a known bad source in block 224, the executable code may be removed in block 226.

Figure 3:
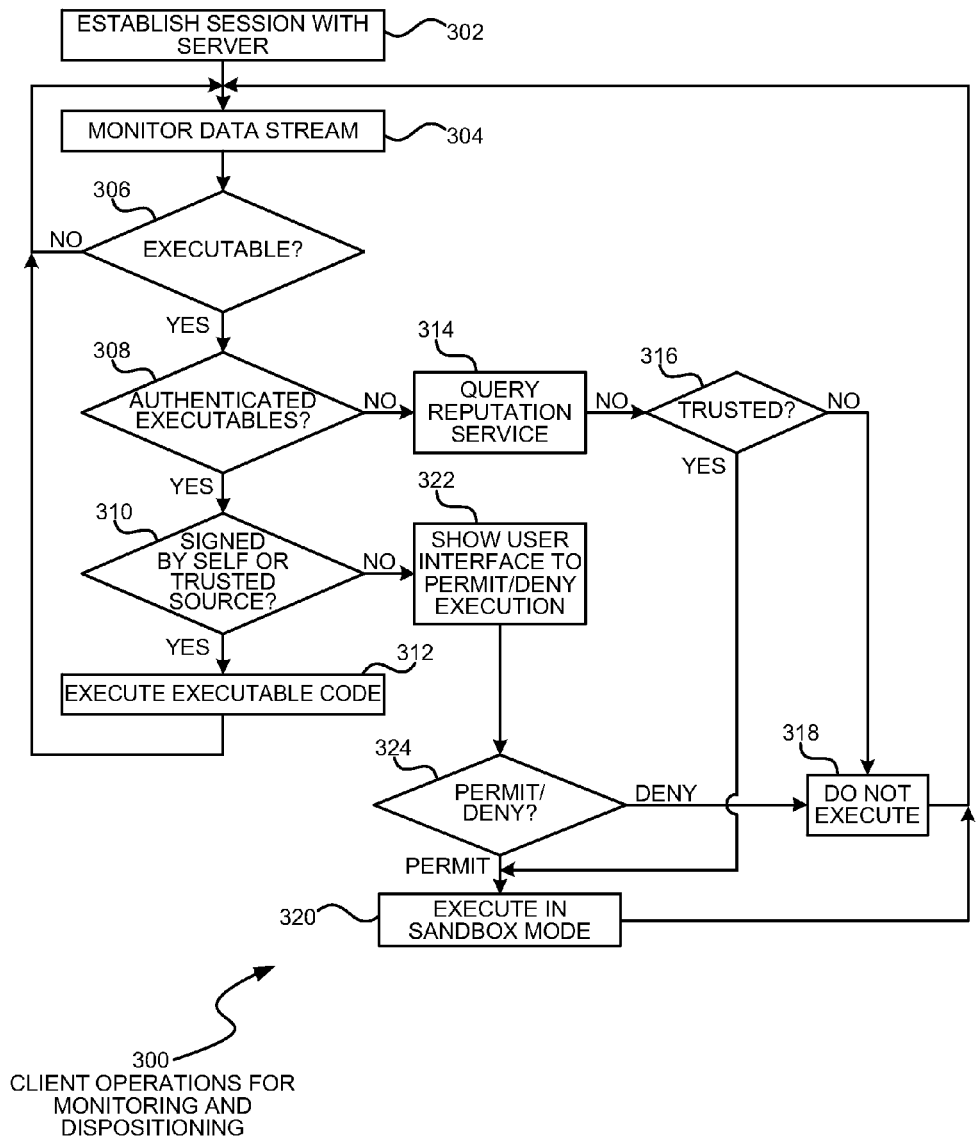
FIG. 3 is a flowchart illustration of an embodiment showing a method for client operations when monitoring and dispositioning executable code.

FIG. 3 is a flowchart illustration of an embodiment 300 showing a method for monitoring and verifying executable code as may be performed by a client application. Embodiment 300 is a simplified example of a monitoring and verifying activity that may be performed by a web browser, such as the web browser 120 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is an example of a process that may be performed by a web browser or other application that may receive web services or other communications from a remote server. The operations of embodiment 300 may be built into and integral with an application in some embodiments. In other embodiments, a plug-in application or other modular component may be added to an application to perform some of the processes of embodiment 300.

In block 302, a communication session may be established with a server. In block 304, a data stream may be monitored. Until an executable is detected in block 306, the process may loop back through block 304.

When an executable is detected in block 306, an examination of the data may reveal wither or not the executable code is digitally signed or otherwise authenticated in block 308. If the executable code is not authenticated in block 308, a reputation service may be queried in block 314. Based on the reputation service results, the executable code may be determined in block 316 to be either trusted or untrusted.

If the executable code is untrusted in block 316, the code may be prohibited from executing in block 318. If the executable code is trusted in block 316, the executable code may be executed in a 'sandbox' or restricted mode in block 320. A sandbox mode or restricted mode may execute the code, but may prevent the code from performing certain activities that may be dangerous to the host system.

When the executables are authenticated in block 308 and signed by the source server or one of the trusted sources in block 310, the executable code may be executed in block 312. In block 312, the executable code may be run either with or without a sandbox mode. The process may return to block 304.

If the executable code is authenticated in block 308 but not signed by the source server or a trusted source in block 310, a user interface may be presented in block 322 to allow the user to select from permitting or denying execution. In some embodiments, a security policy may determine the answer without the user interaction.

If the user selects to permit execution in block 324, the executable code may be executed in sandbox or restricted mode in block 320. If the user selects to deny execution in block 324, the executable code may not be executed in block 318. In either event, the process may return to block 304.

Figure 4:
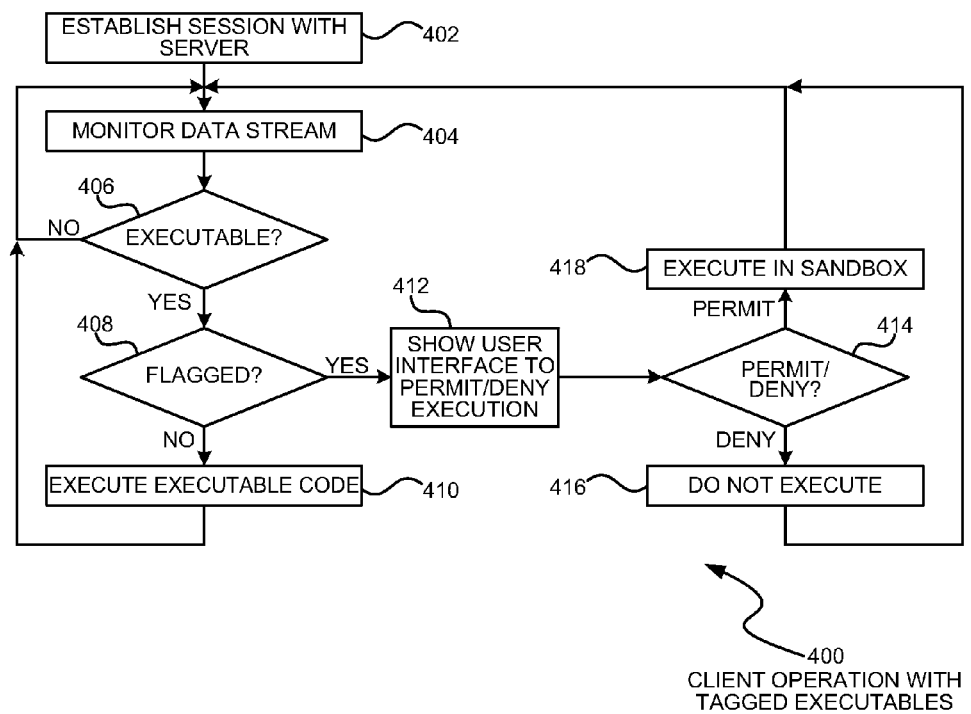
FIG. 4 is a flowchart illustration of an embodiment showing a method for client operations when using tagged executables.

FIG. 4 is a flowchart illustration of an embodiment 400 showing a method for handling a data stream that may have been monitored and tagged by another device or application. Embodiment 400 is a simplified example of a process that may be performed by a client that receives the output of a process such as embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates a process that may be performed by a client device or application when receiving a data stream that has been analyzed upstream by a monitoring and verifying operation. In the examples of embodiment 100, the process performed by embodiment 400 may be performed by the browser 120 when the monitoring and verifying operations were performed by one of the monitor application 124, the gateway device 132, or the proxy device 142.

In block 402, a session is started with a server. A data stream is monitored in block 404. Until executable code is found in block 404, the process may loop back to block 404.

When the executable is detected in block 406 an when the executable is not flagged in block 408, the executable may be executed in block 410.

If the executable is flagged in block 412, a user interface may be displayed to receive user input to permit or deny execution in block 412. If the execution is permitted in block 414, the code may be executed in a sandbox or restricted mode in block 418. If the execution is not permitted in block 414, the code is not executed in block 416. The process may return to block 404.

Embodiment 400 differs from embodiment 300 in that the verification operation may be performed upstream in embodiment 400. Often, such upstream processing may be performed by a separate device or a separate process on the same device as a client application that consumes the data stream. The executable code that is not flagged may be the authenticated executable code, while flagged executable code may be code that is suspect. In the operations of embodiment 200 which illustrate an example of an upstream process, executable code that is known to be bad may be eliminated from the data stream, while executable code that is unknown or questionable may be flagged.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a computer system, the computer system including a processor and system memory, the computer system connected to a Wide Area Network (WAN), the computer system including a Web browser for browsing content offered by other computer systems connected to the Wide Area Network (WAN), a method performed on the processor for mitigating a cross site scripting attack against the computer, said method comprising:

continually monitoring Web based content passed to the Web browser during the web browser session;

during the continual monitoring, detecting a portion of Web based content from a Web server, the portion of content including both executable code for processing at the Web browser and other content for processing at the Web browser, dispositioning the executable code, including:

determining that the executable code is not digitally signed by the Web server;

in response to determining that the executable code is not digitally signed by the Web server, referring to a list provided by the web server, the list listing one or more trusted third parties for executable code supplied by the web server;

determining that the executable code is not digitally signed by any of the listed one or more trusted third parties;

in response to determining that the executable code is not signed by the Web server and is not signed by any of the listed one or more trusted third parties, determining that the executable code is associated with a cross site scripting attack against the computer; and in response to determining that the executable code is associated with a cross site scripting attack, removing the executable code from the Web based content to form a partial set of Web based content, the executable code being removed from the Web based content prior to processing any of the Web based content at the at the Web browser; and presenting the partial set of Web based content at the Web browser subsequent to removal of the executable code.

2. The method of claim 1 further comprising prior to determining that the executable code is associated with a cross site scripting attack, determining that the executable code is from a known bad source.

3. The method of claim 1 further comprising:
the computer system determining that the executable code is suspect, determining that the code is suspect including determining that the executable code is not ok and determining that the executable code is questionably malicious code; and
the computer system tagging the executable code as suspect.

4. The method of claim 1, wherein removing the executable code from the Web based content comprises erasing the executable code from the computer system.

5. The method of claim 1, further comprising prior to determining that the executable code is associated with a cross site scripting attack, referring to a reputation service to determine that the executable code is from a source with a bad reputation.

6. The method of claim 1, wherein referring to a list, comprises referring to a reputation server with a uniform resource location (URL) and receiving back an indication of the one or more trusted third parties.

7. The method of claim 1, wherein determining that the executable code is not signed by the Web server comprises determining that the executable code is not signed using a digital certificate.

8. A system for mitigating a cross site scripting attack, the system comprising:
one or more processors;
system memory;
a network connection; and
a session monitor that:
continually monitors Web based content passed from a Web server to a Web browser during a Web browser session;
during the continual monitoring, detects a portion of Web based content from a Web server, the portion of content including that includes both executable code for processing at the Web browser and other content for processing at the Web browser, dispositions the executable code, including:
determining that the executable code is not digitally signed by the Web server;
in response to determining that the executable code is not digitally signed by the Web server, referring to a list provided by the web server, the list listing one or more trusted third parties for executable code supplied by the web server;
determining that the executable code is not digitally signed by any of the listed one or more trusted third parties;
in response to determining that the executable code is not signed by the Web server and is not signed by any of the listed one or more trusted third parties, determining that the executable code is associated with a cross site scripting attack against the computer;
in response to determining that the executable code is unsafe for execution, removing the executable code from the Web based content to form a partial set of Web based content, the executable code being removed from the Web based content prior to processing any of the Web based content at the Web browser; and
present the partial set of Web based content to the Web browser subsequent to removal of the executable code.

9. The system of claim 8, the session monitor being incorporated into a standalone application.

10. The system of claim 8, the session monitor being incorporated into a Web browser plugin.

11. The system of claim 8 being incorporated into a network device.

12. The system of claim 11 being a firewall device.

13. The system of claim 8, wherein the session monitor further:
determines that executable code is not properly authenticated;
refers to a reputation service to determine that the executable code is from a source with a bad reputation; and
wherein creating a partial set of Web based content for the portion of Web based content by removing the executable code from the portion of Web based content comprises erasing the executable code.

14. A web server comprising:
a processor;
a network connection;
a web service that:
receives request web page requests from Web browsers at client computer systems; and
sends web pages to Web browsers at the client computer systems in response to received requests;
a monitor that:
continually monitors Web pages sent to Web browsers at client computer systems;
a verifier, for protecting computer systems from potentially malicious code, that:
during the continual monitoring detects a Web page from a Web server, the Web page including that includes both executable code for processing at a Web browser and other content for processing at the Web browser, dispositions the executable code, including:
determining that the executable code is not digitally signed by the Web server;
in response to determining that the executable code is not digitally signed by the Web server, referring to a list provided by the web server, the list listing one or more trusted third parties for executable code supplied by the web server;
determining that the executable code is not digitally signed by any of the listed one or more trusted third parties;
in response to determining that the executable code is not signed by the Web server and is not signed by any of the listed one or more third parties, determining that the executable code is associated with a cross site scripting attack against the computer;
in response to determining that the executable code is associated with a cross site scripting attack, removing the executable code from the Web page to form a partial set of Web based content, the executable code removed from the Web page prior to sending the Web page to the Web browser at the client computer system; and
sends the partial Web page to the Web browser at the client computer system.

15. The web server of claim 14, wherein the verifier further determines, prior to determining that the executable code is associated with a cross site scripting attack, that the executable code is from a known bad source.

16. The web server of claim 15, wherein the verifier further determines, prior to determining that the executable code is associated with a cross site scripting attack, that the executable code is not trusted.

17. The web server of claim 15, wherein the other content is an HTML document.

\* \* \* \* \*